United States Patent
Schneider et al.

[15] 3,694,723
[45] Sept. 26, 1972

[54] MOTOR VEHICLE WINDSHIELD WIPER HAVING A PARKING POSITION OUTSIDE THE WIPING AREA

[72] Inventors: Theodor Schneider, Seestrasse 30, 7121 Freudental Wurttemberg; Karl-Friedrich Schubert, Friedrich Naumannstrasse 10; Jacob Heinz, Frankfurter Strasse 15, both of 712 Bietigheim Wurttemberg, all of Germany

[22] Filed: Aug. 24, 1971

[21] Appl. No.: 174,336

[30] Foreign Application Priority Data

Dec. 30, 1970 Germany..........P 20 64 423.9

[52] U.S. Cl............................318/443, 200/153 LB
[51] Int. Cl..................................................H02p 7/00
[58] Field of Search ....318/443, DIG. 2; 200/153.2 B

[56] References Cited

UNITED STATES PATENTS

| | | | |
|---|---|---|---|
| 2,546,077 | 3/1951 | Peter................... | 200/153.2 B |
| 2,996,585 | 8/1961 | Lehde................. | 200/153.2 B |
| 3,057,973 | 9/1962 | Goodhouse......... | 200/153.2 B |
| 3,117,335 | 1/1964 | Oishei et al.......... | 318/DIG. 2 |

*Primary Examiner*—Bernard A. Gilheany
*Assistant Examiner*—F. E. Bell
*Attorney*—John J. McGlew et al.

[57] ABSTRACT

A windshield wiper for motor vehicles has a parking position of the wiper arm outside the wiping area, and includes a motor having a drive shaft, a crank guide member secured to the shaft, a resiliently biased crank member adjustable longitudinally of the guide member, switching means operable to initiate a parking movement and control means included in the switching means and engageable with a cam rotated with the crank member, upon activation of the switching means, to very the crank radius against the resilient bias. The control cam has, with respect to its direction of rotation, a steep ascent surface and an extended descent surface, which are engageable by the control member. Preferably the control cam is fixedly connected to the crank member and actuates an additional contact of the switching means only in the wiper parking position, to effect final switching off of the wiper motor.

5 Claims, 3 Drawing Figures

Inventors
THEODOR SCHNEIDER
KARL FRIEDRICH SCHUBERT
HEINZ JAKOB
BY John J. McGlew
ATTORNEY

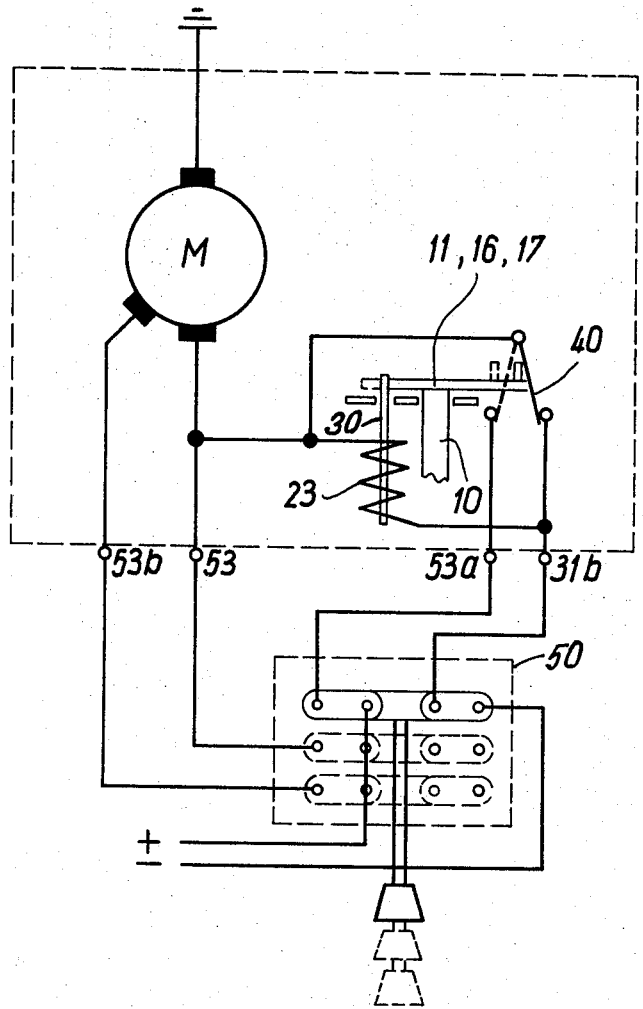

3,694,723

MOTOR VEHICLE WINDSHIELD WIPER HAVING A PARKING POSITION OUTSIDE THE WIPING AREA

FIELD OF THE INVENTION

This invention relates to windshield wipers and, more particularly, to a novel and improved windshield wiper having a parking position of the wiper arm outside the wiping area.

BACKGROUND OF THE INVENTION

Application Ser. No. 121310, filed Mar. 23, 1971, discloses a windshield wiper for vehicles, such as automotive vehicles, which has a parking position, of the wiper arm, outside the wiping area. In this windshield wiper, upon switching off the wiper switch, a switching means is energized and initiates a parking movement by varying the crank radius of the driven shaft of the motor. The crank consists of a crank guide member fixedly connected to the driven shaft of the motor, and a crank member adjustable, within limits, in the crank direction, this crank member being supported and guided by means of one or more resilient elements. The crank also includes a control member which, when parking is desired, projects into the path of movement of the crank member and varies the crank radius against the action of the resilient element or elements, to effect the additional parking movement. Either the control member of the switching means, or the crank member, or both support control cams which cause a predetermined displacement of the crank member along the crank guide.

This windshield wiper has only a few and simple parts, which insures maintenance-free operation. However, when the driving motor is turned on or energized, the crank is returned into the normal working position at such a speed that the wiper blades spring too quickly out of the parking position. Additionally, the final switching off or deenergization of the wiper motor causes difficulties. Yet a further disadvantage of such a windshield wiper consists in that the movement of the wiper blades into the parking position does not occur if, when switching off, the crank is at a position immediately over the control member of the switching means, so that the control cam cannot come into operation.

SUMMARY OF THE INVENTION

The objective of the present invention is to improve a windshield wiper of the type mentioned so that the mentioned disadvantages are eliminated. Accordingly, the present invention provides a windshield wiper for vehicles, more especially for automotive vehicles, of the type disclosed in application Ser. No. 127,310, but wherein the control cam has a steep ascent surface and an extended descent surface considered with respect to its direction of rotation.

With the invention arrangement, the wiper parking position is reached at speed when the wiper switch is moved to the off position. However, the wiper blades will not spring out of the parking position when the motor is energized to start the windshield wiper. Additionally, the wiper blades are moved safely into the parking position, independently of the crank position, at the time when the wiper switch is moved to the off position. The control cam is fixedly connected to the crank member and controls an additional contact which deenergizes the wiper motor when the blades are parked.

An object of the invention is to provide an improved windshield wiper for motor vehicles of the type having a parking position of the wiper arm outside the wiping area.

Another object of the invention is to provide such a windshield wiper in which the wiper parking position is reached at speed when the wiper switch is moved to the off position.

A further object is to provide such a windshield wiper in which the wiper blades will not spring out of the parking position when the motor is re-energized.

Another object of the invention is to provide such a windshield wiper including a control cam having, with respect to its direction of rotation, a steep ascent surface and an extended descent surface.

For an understanding of the principles of the invention, reference is made to the following description of a typical embodiment thereof as illustrated in the accompanying drawing.

BRIEF DESCRIPTION OF THE DRAWING

In the drawing:

FIG. 3 is schematic wiring diagram of the windshield wiper installation.

DESCRIPTION OF THE PREFERRED EMBODIMENT

Figure 1:
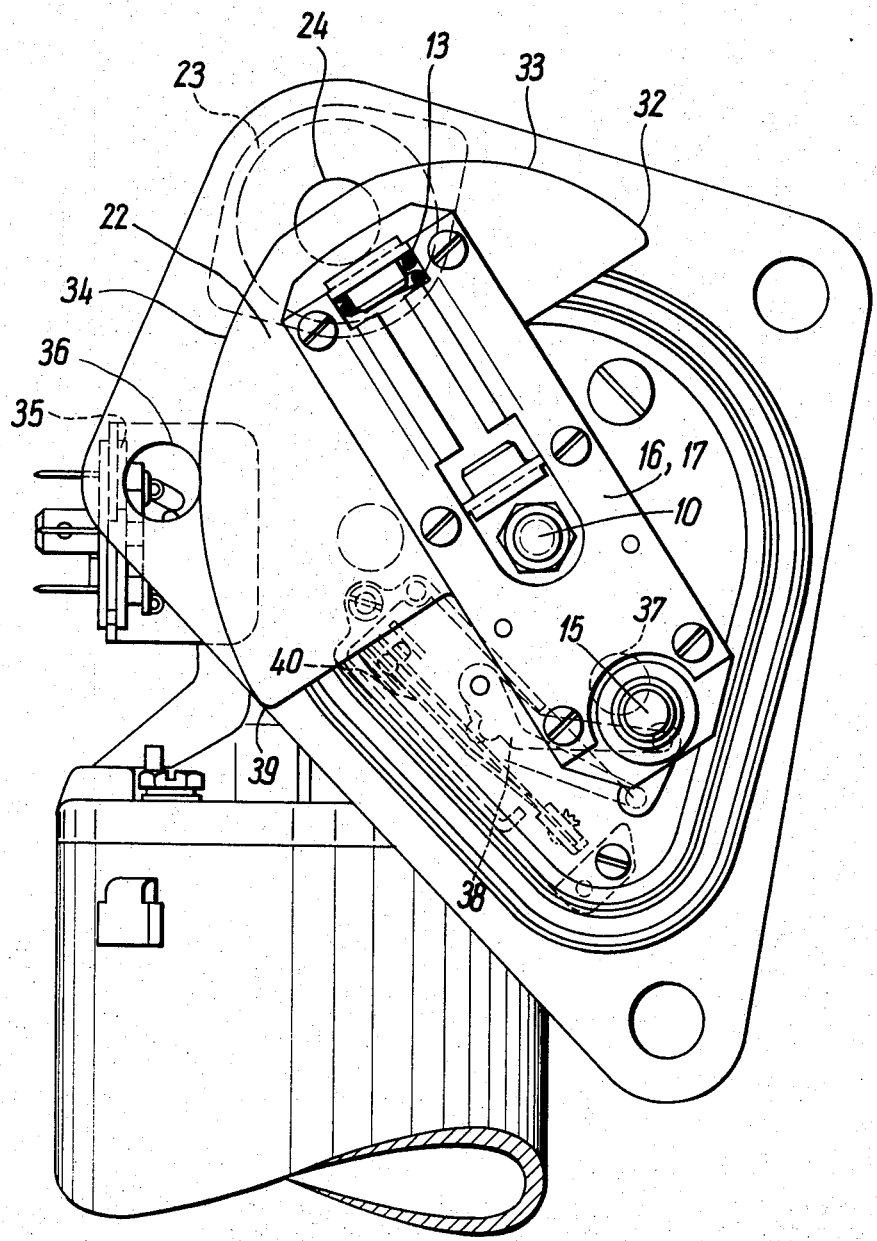
FIG. 1 is a plan view of the crank driven by the shaft of the driving motor.
Figure 2:
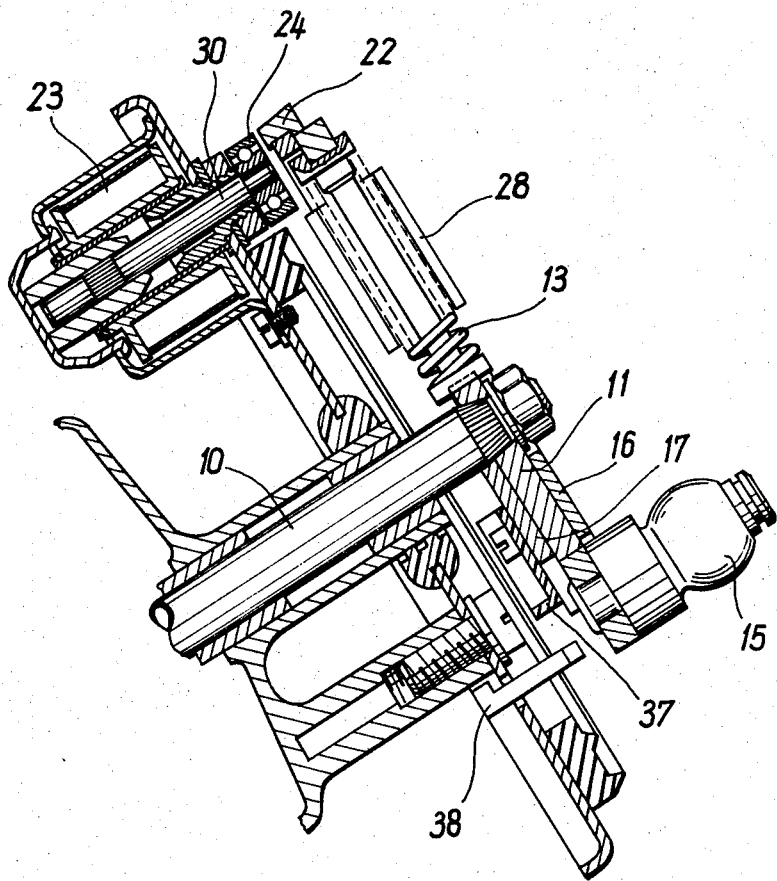
FIG. 2 is a sectional view through the crank.

Referring to FIGS. 1 and 2, a motor driving shaft 10 has fixed thereto a crank guide member 11 which is mounted for sliding movement between guides 16 and 17 and carries a crank member 15. Crank member 15 is biased in one direction along crank guide member 11 by a spring 13 covered by a sleeve 28.

The switching means comprises a solenoid 23 and a control member 24 in the form of a ball bearing mounted roller which may be moved into the path of movement of the crank by an armature 30, upon energization of solenoid 23. The crank carries a control cam 22 extending in the plane of rotation of the crank and, when solenoid 23 is energized, this cam, beginning at the point 32, moves crank 15 with respect to crank guide member 11 in correspondence with the cam curve 33. Curve 33 extends through only a limited angle of rotation of crank 15, and is fairly steep, so that the parking movement is effected very quickly by changing the crank radius.

Referring to FIG. 3, when wiper switch 50 is moved to the off position, solenoid 23 is energized since the retracted crank 11, 16, 17 retains an additional contact 40 in the position shown in broken lines. The control members 38 for this additional contact 40, as shown in FIG. 1, is left under control of the switching cam 37. When the additional contact 40 is transferred, switching solenoid 23 and motor M are disconnected from the supply voltage. Motor M and solenoid 23 are short-circuited as shown by the solid line position of contact 40, and this short-circuit of motor M provides a braking force which causes motor M to stop rapidly.

When wiper switch 50 is moved to an on position, motor M is energized through either its terminal 53 or its terminal 53b. During rotary movement of the crank, switching roller 24 is in rolling engagement with the extended descent curve 34 of control cam 22. Descent curve 34 extends through a greater angle of rotation than does ascent curve 33, so that wiper transfer from the parking position into the normal wiping position is effected without any sudden movement of the wiper blade. When roller 34 reaches the terminal 39 of descent surface 33, the roller disengages the cam surface. This causes armature 30 of solenoid 23 to reverse its movement or to move inwardly, and the wiper movement continues with a reduced crank radius until switch 50 is again moved to the off position.

Slider part 17, as best seen in FIG. 2, carries switching cam 37 on its underside. Cam 37 deflects the operating lever 38, for actuating contact 40, only when crank member 15 is displaced longitudinally of the crank radius, so that the crank radius is extended with switching means 23 being energized.

Roller 36 of a contact 35 is also in rolling engagement along control cam 22, and contact 35 maintains solenoid 23 energized when switching off of the wiper is initiated. This obviates the necessity for a mechanical lock between switching means 23 and the crank.

While a specific embodiment of the invention has been shown and described in detail to illustrate the application of the principles of the invention, it will be understood that the invention may be embodied otherwise without departing from such principles.

What is claimed is:

1. A windshield wiper for motor vehicles, having a parking position of the wiper arm outside the wiping area, and of the type including a motor having a drive shaft, a crank guide member secured to the shaft, a resiliently biased crank member adjustable longitudinally of the guide member, switching means operable to initiate a parking movement and control means included in the switching means and engageable with control cam means rotatable with the crank member, upon activation of the switching means, to vary the crank radius against such resilient bias; in combination, said control cam means including a control cam having, with respect to its direction of rotation, a steep ascent surface and an extended descent surface, engageable by said control member.

2. A windshield wiper for motor vehicles, as in claim 1, wherein said control cam means is fixedly connected to said crank member.

3. A windshield wiper for motor vehicles, as in claim 1, including a switch having contacts controlling connection of said motor to a source of potential; and an additional contact included in an energizing circuit for said motor; said control cam means actuating said additional contact only when said switch is moved to the wiper parking position, to perform the final disconnection of said motor.

4. A windshield wiper for motor vehicles, as in claim 3, in which said control cam means includes a switching cam cooperable with said additional contact.

5. A windshield wiper for motor vehicles, as in claim 4, in which said switching means comprises a solenoid having an armature operating said control member; said additional contact, when operated by said switching cam, short-circuiting said solenoid and said motor.

* * * * *